United States Patent [19]

Colletti et al.

[11] 3,823,576
[45] July 16, 1974

[54] UNIVERAL JOINT FOR VEHICLE STEERING COLUMN

[75] Inventors: John B. Colletti, Grosse Point Park; Leonard J. Zukowski, Sterling Heights, both of Mich.

[73] Assignee: TRW Inc., Cleveland, Ohio

[22] Filed: Aug. 22, 1972

[21] Appl. No.: 282,767

[52] U.S. Cl. .................. 64/8, 64/11 R, 64/27 NM, 64/13
[51] Int. Cl. ............................................ F16d 3/00
[58] Field of Search............ 64/8, 17 R, 17 S, 11 R, 64/27 NM, 27 R, 31, 13, 10

[56] References Cited
UNITED STATES PATENTS

| | | | |
|---|---|---|---|
| 419,241 | 1/1890 | Bitley | 64/10 |
| 2,959,437 | 11/1960 | Piragino | 64/11 |
| 3,067,596 | 12/1962 | Caunt | 64/11 |

FOREIGN PATENTS OR APPLICATIONS

| | | | |
|---|---|---|---|
| 626,377 | 2/1936 | Germany | 64/10 |

*Primary Examiner*—Samuel Scott
*Assistant Examiner*—Randall Heald
*Attorney, Agent, or Firm*—Hill, Gross, Simpson, Van Santen, Steadman, Chiara & Simpson

[57] ABSTRACT

A Universal joint connection including a housing with four circular bores extending thereinto, the bores being formed at the corners of a square, the bores being closed at both ends by walls. Diagonally opposed bores having slots through one end wall on each side of the device, the bores having spool bearings therein, the bearings receiving ball ends of ball-ended studs, the shanks of which project through the slots whereby two studs project from each side of the unit. The shanks being attached to driving and driven column shafts.

6 Claims, 4 Drawing Figures

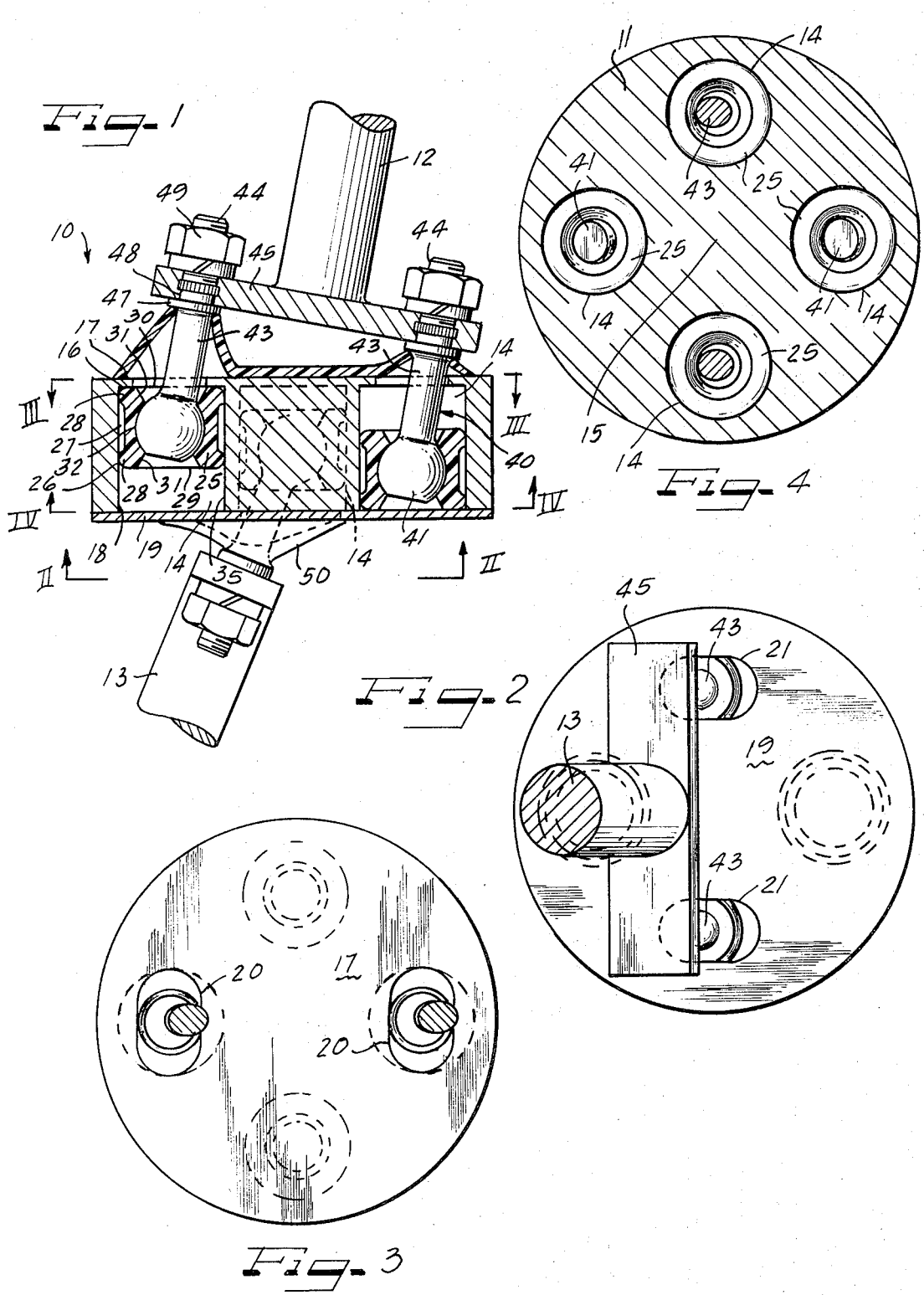

UNIVERSAL JOINT FOR VEHICLE STEERING COLUMN

BACKGROUND OF THE INVENTION

1. Field of the Invention

This invention relates to universal joints and more particularly to a multiple ball stud universal joint capable of transmitting torque and rotational movement and of accommodating axial movement.

2. Prior Art

Universal joints capable of transmitting rotation through shafts which are in angular relation to one another are well-known to the art. Such prior art has included universal joints constructed utilizing ball-ended studs received in bearing blocks. The stud is attached to one column shaft and the bearing block is attached to a housing on another column shaft. An example of such prior art is found in the U.S. Pat. No. 3,609,994, issued Oct. 5, 1971, to J. B. Colletti et al.

In certain embodiments, it is desirable not only to transmit torque through an angled shaft connection, but it is also highly desirable to provide isolation between the shafts. The standard universal joints of the prior art do not provide such isolation.

Some prior art devices have been devised to transmit torque through an angled shaft connection which does provide isolation, however, such devices generally are not capable of accommodating angles greater than approximately 5°. Further, prior art universal joints both of the non-isolated and isolated type are generally not capable of accommodating axial deflection.

It would therefore be an advance in the art if a single universal joint could be provided capable of accommodating angles of divergence of the respective driving and driven shafts greater than 5°, capable of providing isolation between the shafts to prevent transmission of shock, etc., and capable of accommodating axial deflection. A specific usage for such a device would be in a steering column shaft for vehicles wherein the steering wheel shaft is mounted at an angle to the steering gear shaft.

SUMMARY

Our invention provides a universal type joint which meets the above criteria. The joint consists of a housing member having a plurality of axial bores therethrough, the bores being equally spaced radially from the center of the housing member and being disposed as if they were at the corners of a square. The bores are closed at their axial ends by wall portions. The wall portions of diagonally opposed bores have slots therethrough at a single common axial end of the bore opposed to the slots of the other pair of diagonally opposed bores. Thus, two bores open to one axial end of the housing and two bores open to the other axial end of the housing.

Received within the bores are spool bearings which have an axial dimension less than the axial dimension of the bore, and which are axially movable in the bore. The bearings receive the ball ends of ball studs. The stud shanks project through the slots in the end walls so that two studs project from each axial end wall. The ball ends of the studs are tiltable in the bearings whereby the studs can project at a non-axial angle. The studs on each side are connected to a common shaft. Because the bearings can move only axially in the bores, torque can be transmitted through the studs and the bearings to the wall of the housing which will cause rotation of the housing and of the other pair of studs.

However, because the bearings are axially movable in the bores, the device is capable of accommodating axial deflection between the driving shafts.

Further, because the studs are free to oscillate in the bearing and because the slots are larger than the stud diameters, the device is capable of transmitting torque between a driving and a driven shaft at angles to one another. Further, because the ball ends of the studs are received in the bearings, the shafts are isolated from one another.

Thus, the device provides a universal joint capable of transmitting torque between two shafts disposed at an angle to one another while isolating the shafts from one another and accommodating axial movement of the shafts. Further, the degree of angularity allowable in the driving and driven shafts with respect to one another can be considerably greater than 5° and is in fact limited only by the dimensioning of the slots.

It is therefore an object of this invention to provide a universal joint consisting of a plurality of ball-ended studs received in bearings in a common housing where the bearings are axially movable in the housing.

It is another object of this invention to provide a universal joint composed of ball-ended studs received in a housing and projecting therefrom with some of the studs projecting opposite others of the studs and the studs being held in the housing in bearing members allowing angular movement of the studs.

It is another and more particular object of this invention to provide a universal joint having a housing with axial bores therein, the bores receiving spool bearings, the bearings receiving ball ends of ball-ended studs, the studs projecting from opposite sides of the housing and being attached to respectively driving and driven shafts disposed at an angle to one another, the studs being received in the bearings in a manner allowing oscillation of the studs within the bearings.

It is another and more particular object of this invention to provide a universal joint consisting of a housing with axial bores therein with slots at ends of the housing open to the exterior communicating to the bores, the bores containing spool bearings therein, the bearings receiving the ball end of ball-ended studs, the studs projecting through the slots, some of the studs projecting opposite the other studs, the free ends of the studs attached respectively to driving and driven shafts, the studs oscillatory in the bearings and the bearings having an axial dimension less than the axial dimension of the bores whereby the bearings are axially movable in the bores.

It is a general object of this invention to provide a universal joint capable of accommodating shafts disposed at an angle to one another greater than 5° and providing isolation between the shafts and accommodating axial deflection of the shafts.

BRIEF DESCRIPTION OF THE DRAWINGS

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

FIG. 1 is a fragmentary cross-sectional view of the universal joint of this invention connected to driving and driven shafts;

FIG. 2 is an end plan view taken along the lines II—II omitting the seals;

FIG. 3 is a view similar to FIG. 2 from the opposite end taken along the lines III—III and omitting the seals; and FIG. 4 is a cross-sectional view of the housing of the device of FIG. 1 taken along the lines IV—IV.

DESCRIPTION OF THE PREFERRED EMBODIMENT

FIG. 1 illustrates the universal joint 10 according to this invention. The joint 10 includes a housing 11 disposed intermediate a driving 12 and a driven 13 shaft. The shafts 12 and 13 are disposed at an angle to one another and the device comprises a universal joint for connecting the shafts. The housing 11 has four bores 14 therethrough. As illustrated in FIG. 4, the housing bores 14 are equidistantly spaced from the center 15 and are disposed with relation to one another as if they were formed at the corners of a square. The bores 14 are closed at one axial end 16 by a wall 17 of the housing and at the other axial end 18 by a closure plate 19. The axial end wall 17, as best illustrated in FIG. 3, has a pair of slots 20 therethrough. The slots 20 are disposed overlying diagonally opposed bores 14. The slots 20 are elongated having a major axis approximately the same as the diameter of the circular bores 14 and a minor axis less than that diameter. The slots are aligned with one another with a major axis lying along the line of oscillation of ball-ended studs received in the bores during operation of the universal joint.

The end plate 19 best illustrated in FIG. 2 has a pair of slots 21 therein. The slots 21 are dimensioned substantially the same as the slots 20 and open to the other pair of bores 14. Thus, the slots 20 open to one pair of diagonally opposed bores 14 while the slots 21 open to the other pair of diagonally opposed bores 14.

Disposed within the bores 14 are spool valves 25. The spool valves are circular, having an outer periphery 26 with an axially central reduced-diameter section 27 providing bearing lands 28 at the periphery adjacent axial ends 29 and 30. Conically shaped throat openings 31 extend into the bearings from the axial ends 29 and 30, the throat openings reducing in size to a larger central spherical seat 32. The diameter of the spool bearings is dimensioned with respect to the bores 14 so that the bearings are received therein with the bearing lands 28 in bearing surface with the walls 35 of the bores 14. For the purposes of this description, the term "spool bearing" refers to a bearing body having a circular peripheral wall with one or more reduced-diameter recesses circumferentially thereof intermediate the axial ends of the bearing.

The spool bearings 25 have an axial dimension less than the axial dimension of the bores 14, and are axially movable therein. Four ball-ended studs 40 are disposed within the housing 11 with the ball ends 41 of the studs received in the spherical seats 32 of the spool bearings 25 and the shanks 43 projecting out of the slots 20,21. The shanks 43 terminate in threaded ends 44 which are attached to a T-bar end 45 of driving and driven shafts 12 and 13. The shanks have increased-diameter ledges 47 thereon adjacent the threaded ends 45. The threaded ends are inserted through openings 48 in the T-bar end 45. The T-bar end 45 is entrapped between the ledges and fastening nuts 49 threaded onto the threaded ends 44. In this manner, the studs 40 project at a right angle to the T-bar end 45 and are maintained at that angle. Thus, torque can be transmitted directly from the shaft to the housing 11 through the studs and bearings 25. However, because the shanks terminate in ball ends 41 received in spherical seats 32, the studs are free to tilt in their projection from the bearing. Thus, during rotation of the driving and driven shafts, the studs 40 will oscillate in the bearings to accommodate the angularity of the driving and driven shafts.

The oscillation is accommodated in the projection of the studs from the housing by means of the elongated slots 21. Seals 50 may be provided on the axial ends 17, 18 of the housing around the shanks 43 to prevent entry of contaminants into the bores 14 through the slots 20,21.

It can therefore be seen that our invention provides a universal joint capable of transmitting torque through the studs and bearings to the housing and from the housing to the opposed set of bearings and studs. Further, isolation is provided from the driving to driven shaft, first because of the receipt of the studs in the bearing blocks, and secondarily because of the design of the bearing block as a spool. By constructing the spool bearings 25 of an elastomeric material such as a polyurethane, vibration absorbing characteristics are imparted to the device. Further, the geometrical shape of the spool bearing, providing the reduced-diameter section 27, increases the ability of the bearing to accommodate vibration and to provide dampening of vibration through the system. A combination of various materials for the bearing and various sizes of reduced-diameter sections 27 can vary the dampening and isolating qualities of the assembly.

It should further be appreciated that the design of this universal joint accommodates angularity of the driving and driven shafts by transmitting rotary motion through the studs while oscillating the studs in the bearings. Additionally, axial movement of the driving and driven shafts with respect to one another is provided by allowing the bearings 25 to slide axially in the bores 14.

It will further be appreciated that during normal displacement, the spool bearings of attached-together studs will be disposed at equal points intermediate the axial ends of the bores. It is only when axial displacement occurs that the spool bearings will move axially in the bores. The illustration of FIG. 1 has been tilted from normal operation conditions to show the axial movability of the spool bearings.

Although the teachings of our invention have herein been discussed with reference to specific theories and embodiments and although illustrative means for accomplishing explained results have been described, it is to be understood that these are by way of illustration only and that others may wish to utilize our invention in different designs or applications.

We claim as our invention:

1. A universal joint comprising a housing having opposite faces and four axial chambers between said faces arranged in two diametrically opposed pairs with the chambers of one pair opening to one face and the chambers of the other pair opening to the other face, a bearing of vibration absorbing material and of substantially less length than said axial chambers slidably mounted in each chamber, each of said bearings having an internal ball chamber, a first pair of laterally spaced axially extending ball-ended studs projecting into the chambers opening to one face of the housing and having the ball ends thereof seated in said internal ball chambers of the bearings in said housing chambers, a second pair of laterally spaced axially extending ball-ended studs projecting into the chambers opening to the other face of the housing and having ball ends seated in the internal ball chambers of the bearings in said housing chambers, said ball ends of the stud being tiltable in the internal ball chambers of the bearings to accommodate universal movements between the first and second pairs of studs, said bearings being slidable in said chambers to accommodate variations in axial spacing of said first and second pairs of studs, said vibration absorbing material of the bearings dampening vibration between the first and second pairs of studs, and means at the opposite faces of the housing engageable with all of said bearings for preventing withdrawal of any of said bearings from the housing while accommodating said tilting of the studs.

2. A universal joint adapted to transfer torque between axially spaced driving and driven shafts in angled relation while dampening shock and accommodating axial deflection of the shafts which comprises a pair of axially spaced shafts each fixedly carrying a pair of laterally spaced axially projecting ball-ended studs, a housing between said axially spaced shafts having two pairs of diametrically opposite axial bores, the bores of one pair receiving the ball ends of the studs projecting from one shaft, the bores of the other pair receiving the ball ends of the studs projecting from the other shaft, ball seat bearings of vibration absorbing material slidable in said bores and each receiving the ball end of a stud in tiltable relation, said bearing being shorter than the length of said bores to accommodate sliding of the bearings to and from the opposite faces of said housing, and means at the opposite ends of said bores engageable with all of said bearings for preventing withdrawal of any of said bearings from the bores while accommodating tilting of the studs.

3. A universal joint adapted to transmit rotation between axially spaced driving and driven shafts disposed at an angle to one another while accommodating variations in spacing of the shafts and dampening of vibration between the shafts which comprises driving and driven shafts in axially projecting studs, a housing between said shafts having axial bores receiving the ends of said studs, spool bearings supporting said studs in said bores, said spool bearings having axial lengths substantially less than the axial lengths of said bores and being slidable in said bores to accommodate axial shifting of said shafts without loss of rotation between the shafts, said bearings being formed of a vibration absorbing plastic material, and means at the ends of the axial bores engageable with all of said bearings for limiting the travel of all of said bearings in the bores.

4. The universal joint of claim 1 wherein the bearings are plastic blocks with circular peripheral walls having at least one reduced diameter recess circumferentially thereof intermediate the axial ends thereof and the chambers in the housing are cylindrical.

5. The universal joint of claim 2 wherein the bearings are plastic blocks and the ball-receiving chambers thereof are open-ended and embrace the major portion of the ball end of a stud therein.

6. The universal joint of claim 3 wherein the plastic bearing blocks are formed of polyurethane.

* * * * *

Disclaimer 3,823,576.—*John B. Colletti*, Grosse Point Park, and *Leonard J. Zukowski*, Sterling Heights, Mich. UNIVERSAL JOINT FOR VEHICLE STEERING COLUMN. Patent dated July 16, 1974. Disclaimer filed Dec. 5, 1977, by the assignee, *TRW Inc.*

Hereby enters this disclaimer to claims 1–6 of said patent.

[*Official Gazette April 18, 1978.*]